United States Patent [19]
Smith et al.

[11] Patent Number: 5,579,561
[45] Date of Patent: Dec. 3, 1996

[54] SEAT BELT GRIPPING DEVICE FOR USE WITH CHILD SAFETY SEATS

[76] Inventors: Keith T. Smith, 532 Alexander Crescent, NW., Calgary, Alberta, Canada, T2M 4V1; Gord McDougall, 412 W. Eufaula, Norman, Okla. 73069

[21] Appl. No.: 400,062

[22] Filed: Mar. 7, 1995

[51] Int. Cl.⁶ ..................................................... A44B 11/06
[52] U.S. Cl. .............................. 24/170; 24/514; 269/239; 269/243
[58] Field of Search ............................ 297/443; 269/243, 269/239; 24/514, 502, 525, 170

[56] References Cited

U.S. PATENT DOCUMENTS

| | | |
|---|---|---|
| 632,793 | 9/1899 | Sell et al. . |
| 715,495 | 12/1902 | Merrill et al. . |
| 2,326,271 | 8/1943 | Wessinger ........................... 24/514 X |
| 3,203,421 | 8/1965 | Bialick ................................. 24/514 X |
| 3,480,325 | 11/1969 | Kramer . |
| 3,713,693 | 1/1973 | Cadiou . |
| 4,725,076 | 2/1988 | Taylor . |
| 4,786,078 | 11/1988 | Schreier et al. . |
| 4,796,919 | 1/1989 | Linden . |
| 4,799,737 | 1/1989 | Greene . |
| 4,826,250 | 5/1989 | Ibanez . |
| 4,832,367 | 5/1989 | Lisenby . |
| 4,893,835 | 1/1990 | Linden . |
| 4,912,818 | 4/1990 | Meeker . |
| 4,946,198 | 8/1990 | Pittore et al. . |
| 5,000,481 | 3/1991 | Willson . |

*Primary Examiner*—James R. Brittain
*Attorney, Agent, or Firm*—Baker & McKenzie

[57] ABSTRACT

Improved seat belt gripping devices are provided for clamping and locking the shoulder portion and lap portion of a seat belt together in order to adequately secure a child safety seat in place on a car seat. The devices disclosed herein are tamper-resistant so that children and infants will not be able to remove the devices while in use and further the devices disclosed herein are easy to use. The safety devices of the present invention eliminate the need for removing slack from the shoulder portion of the seat belt in order to ensure that the child safety seat will not move in a forward direction during a sudden stop, collision or normal traffic maneuver.

5 Claims, 3 Drawing Sheets

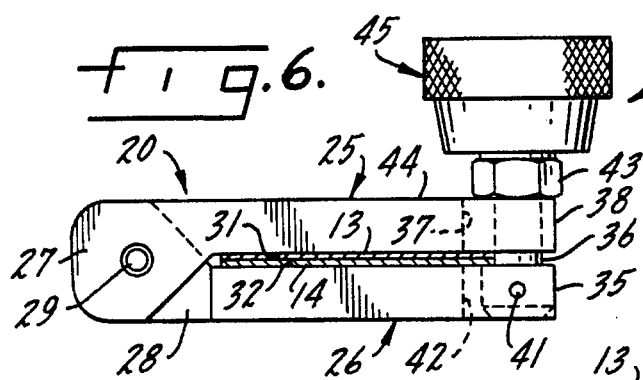
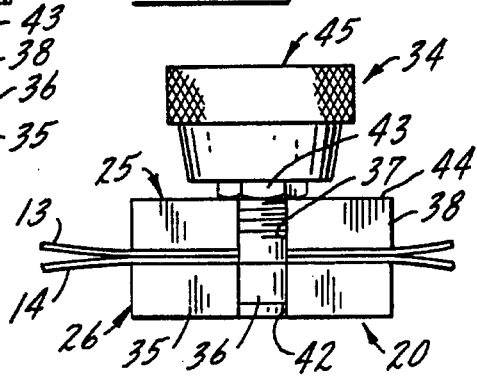
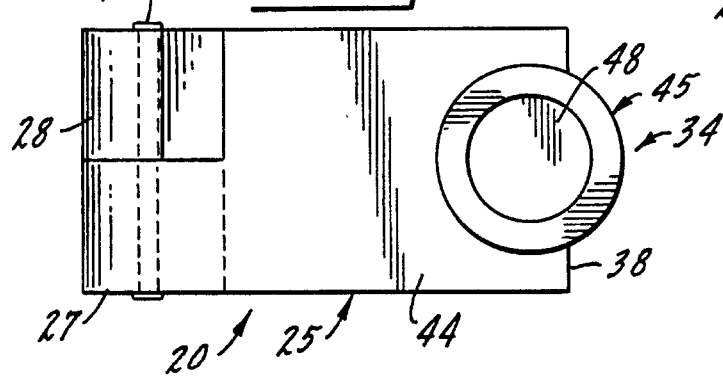
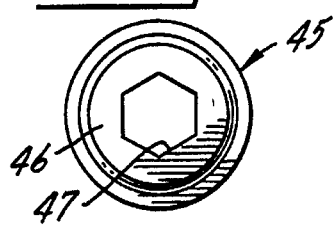
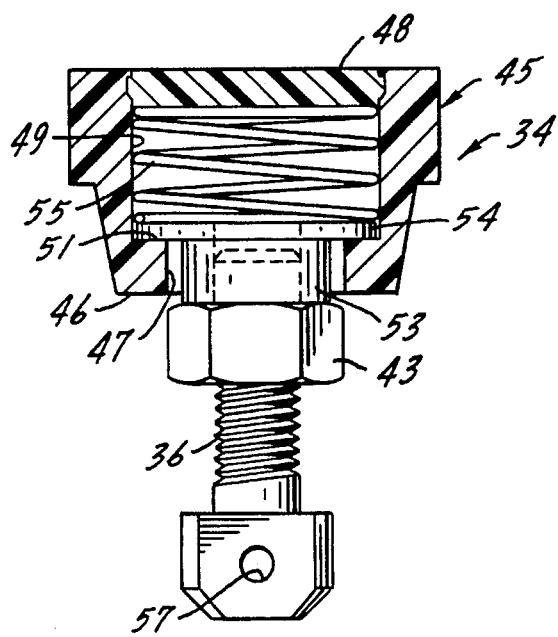
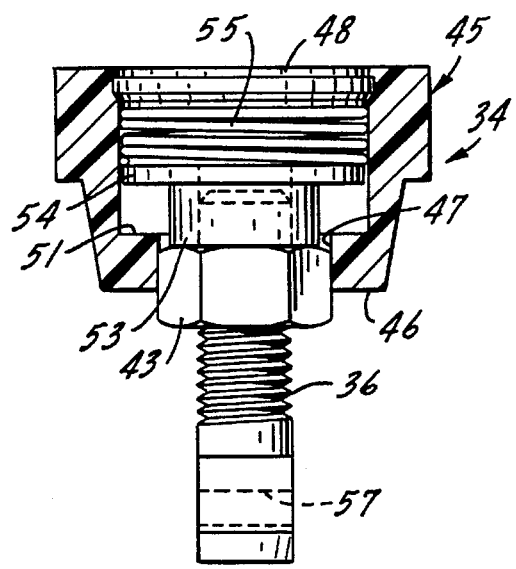

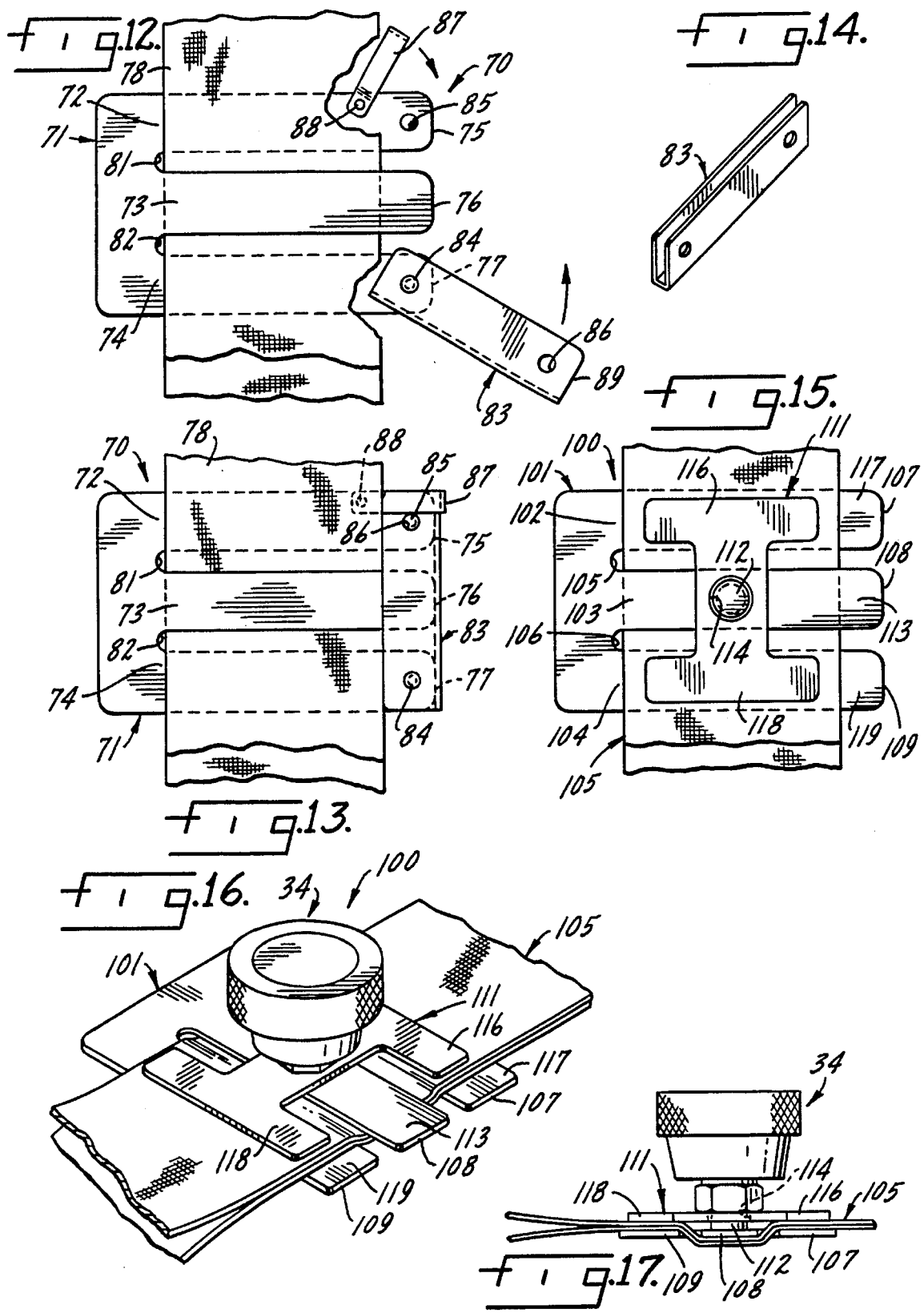

5,579,561

SEAT BELT GRIPPING DEVICE FOR USE WITH CHILD SAFETY SEATS

FIELD OF THE INVENTION

This invention relates generally child safety seats used in automobiles and, more particularly, to an improved seat belt gripping device which clamps or holds the shoulder and lap portions of a seat belt together to prevent forward movement of the child safety seat during sudden braking or in the event of a collision.

BACKGROUND OF THE INVENTION

Child safety seats have been in use in the United States and other jurisdictions for some time. The purpose of a child safety seat is to provide a satisfactory restraining mechanism for small children in the vehicle. The child safety seats are held in place by the vehicle's seat belts.

However, modern safety belts which consist of a shoulder and a lap portion are designed for adults and do not effectively safely restrain small children or child safety seats. Simply put, today's safety belts, if left unmodified, will allow a child safety seat to be thrown forward several inches even if the safety belt is used. This sudden forward movement will cause serious neck and shoulder injuries to a young child.

Hence, there is a problem with holding child safety seats in place on the car seat with conventional seat belts. A full understanding of the problem can be obtained after consideration of the construction and design of modern seat belts.

Generally, seat belts include lap and shoulder portions. The shoulder portion is normally attached to an inertia locking wind-up reel disposed next to the vehicle door or window and the lap portion is generally attached to a fixed anchor on the vehicle floor. The shoulder and lap portions are connected together as a continuous belt at the seat belt buckle or latch plate. The female end of the buckle is also attached to the floor of the vehicle.

When the vehicle stops suddenly or involved in a head-on collision, the inertia locking wind-up reel grasps the shoulder portion of the seat belt after a limited amount of belt is released from the wind-up reel. The locked wheel prevents any additional slack in the belt from being released. A limited amount of belt is released in order to prevent chest injuries to adults and to make the safety belt easy and comfortable to wear for the adult passenger. Normal or gradual movements by the adult passenger will automatically release additional belt from the inertia locking wind-up reel. Only sudden or forceful movements will cause the wind-up reel to lock against the shoulder portion of the belt after a limited amount of slack is released.

However, while some slack needs to be released from the wind-up reel to prevent chest injuries to adults and for the general comfort of an adult passenger, this same amount of looseness or slack causes a serious safety problem for small children seated in child safety seats. Specifically, the release of as little as six to eight inches of slack in the belt will result in a jolting forward movement of the child safety seat which can cause the seat to move forward violently and stop suddenly during hard braking or a collision. Further, in addition to the sudden forward movement, the seat will pivot about the buckle which will impart a twisting force to the child. The result can be serious neck and shoulder injuries to the child, including whiplash. Due to the underdeveloped nature of a young child's neck and shoulder muscles, the injuries can be serious and long lasting.

Accordingly, to remove the possibility of any slack being released from the wind-up reel during a hard brake or collision situation, seat belt gripping devices have been developed which allow the parent to remove any slack from the lap portion of the seat belt and thereafter lock the lap and shoulder portions of the belt together at the buckle. These seat belt gripping devices effectively inactivate the shoulder portion of the belt and allows the child safety seat to be held in place between the seat belt buckle and the lap portion, both of which are securely anchored to the floor of the car.

While these seat belt gripping devices that had been provided are a substantial improvement over no device at all, the devices currently available are still not without substantial problems. Specifically, two current types of devices are available. The first type is a plate-like device with an upper slot, a lower slot and a middle finger. The shoulder and lap portions of the belt are inserted through the upper and lower slots and draped over the front surface of the middle finger portion. This plate-like device relies upon friction to hold the shoulder and lap portions of the belt together. The problem with this type of device is that it is inherently hard for the parent to feed the shoulder and lap portions of the belt through the upper and lower slots. Further, once the shoulder and lap portions of the belt are fed into the slots, adjustment of the clamp while on the belt is extremely difficult. It has been found that many parents do not bother readjusting the belt every time the child safety seat is put in the car which defeats the very purpose of the clamp if slack is present in the lap portion of the belt. Thus, while the plate-like clamp is relatively effective, it is so difficult to use that its safety benefits often go unrealized.

A second type of device includes upper and lower clamping members that simply clamp the shoulder and lap portion of the belt together. However, the only types of these clamps that are currently available include standard knobs or wing-nuts that hold the upper clamping member in position. Because the clamp is placed directly next to the child seat, the children have access to the wing-nut or knob and therefore are able to remove or loosen the clamp.

In summary, while seat belt gripping devices are available for use with child safety seats, all of the currently available seat belt gripping devices are problematic for at least two reasons. First, they are difficult and frustrating for the parents to use and are consequently often used improperly. Second, they are not child-proof and because of their proximity to the child sitting in a car seat, they are often tampered with by the child and rendered ineffective.

Thus, there is a need for a device for use with child safety seats that holds the lap and shoulder portions of the seat belt together and which is both easy-to-use and child-proof.

SUMMARY OF THE INVENTION

The present invention satisfies the aforenoted needs by providing an improved device for preventing the relative movement of the shoulder portion of a seat belt with respect to the lap portion of a seat belt so that a child safety seat will maintain its position in the event of a sudden stop or collision.

One embodiment of the present invention includes two clamp halves that are pivotally connected together. Each clamp half includes an inside gripping surface for frictionally engaging one of the belts, i.e. the shoulder belt or the lap belt.

The first embodiment also includes a child-proof knob assembly for tightening and locking the clamp halves together. The child-proof knob assembly is pivotally connected to one of the clamp halves. Specifically, the preferred embodiment includes a threaded closure pin which is pivotally connected to one of the clamp halves and which is free to pivot upward so that a threaded portion of the pin extends above an upper surface of the opposing clamp half. A child-proof knob is threadably connected to the distal end of the threaded closure pin. The knob is biased into an inoperable position, preferably by a spring contained within the knob body. The knob is only operable when it is pressed downward along an axis defined by the threaded closure pin. Accordingly, to tighten the knob and clamp the two clamp halves together, an adult will push downward on the knob and contemporaneously twist the knob so that it is tightened along the threaded closure pin. A lower portion of the knob assembly will engage an upper surface of one of the clamp halves and further twisting of the knob will result in a tightening of the clamps together with lap and shoulder portions of the seat belt disposed there between.

A preferred embodiment of the child-proof knob includes three parts in addition to the threaded closure pin. Specifically, a threaded nut assembly is disposed on the threaded closure pin. The threaded nut assembly includes a lower nut portion which engages an upper surface of the first clamp half (the second clamp half being the clamp half to which the threaded closure pin is pivotally attached). The threaded nut assembly also includes a narrow tubular body, which extends upward from the lower nut portion, and a wider upper flange disposed at the upper end of the narrow tubular body. The knob includes a closed top with a hollow interior and a bottom opening. The narrow tubular body of the threaded nut assembly extends upward through the bottom opening and the upper flange is disposed within the hollow interior of the knob. Because the upper flange of the threaded nut assembly is wider than the bottom opening of the knob, the upper flange is contained within the knob and the knob maintains its position on top of the threaded nut assembly.

The bottom opening and lower nut portion are designed to be complementary in that the bottom opening will mateably engage the lower nut portion when the child-proof knob is in an operable position so that the lower nut portion will rotate when the knob is pressed downward and rotated. A spring disposed on top of the upper flange between the top portion of the knob in the flange biases the knob into an inoperable position. That is, the spring biases the bottom opening of the knob upward off of the lower nut portion so that the knob must be pressed downward and the bottom opening mateably engaged over the lower nut portion in order for the knob to be in an operable position.

Thus, in operation, after the child safety seat is in place and all the slack has been removed from the lap portion of the belt, adjacent sections of the shoulder belt and lap belt are placed on top of one clamp half. The complementary half is then folded over on top of the two belts and the closure pin in pivoted upward so that the knob is disposed above the upper surface of the top clamp half. The knob is then pressed downward along an axis defined by the closure pin so that the bottom opening mateably engages the lower nut portion of the threaded nut assembly. While pressing downward, the knob is rotated so that the axial position of the lower nut portion moves downward until it firmly engages the upper surface of the clamp half. Additional twisting will be required in order to tightly clamp the two clamp halves together with the belt portions clamped therebetween.

A second embodiment of the present invention includes a first E-shaped plate which includes three fingers and two slots disposed on either side of the middle finger. The user inserts the two adjacent belt portions around the middle finger so that the two belt portions go over the lower finger, through the lower slot and behind or underneath the middle finger, up through the upper slot and over the upper finger. To keep the two belt portions safely disposed around the middle finger, a brace may be pivotally attached to a distal end of the lower or upper finger. The brace can then pivot upward and is latched onto the distal end of the upper finger to close off the two slots and keep the two belt portions safely disposed around the middle finger. The brace may be locked into place with a U-shaped latch or other locking means that is pivotally attached to the upper finger in a position so that it can pivot downward over the end of the brace. If a U-shaped latch is used, the latch should be sized so it snugly engages the locking brace so that a child's finger cannot obtain a purchase on the latch to disengage the latch from the brace. Of course, the brace may be pivotally attached to the upper finger and the locking means may be attached to the lower finger. Further, other locking mechanisms, in addition to the U-shaped latch, will be apparent to those skilled in the art.

As an alternative to the locking brace discussed above, the belt portions may be held in place with the use of a lock plate which is mounted onto the middle finger. That is, with belt portions overlying the upper surfaces of the upper and lower fingers and passing underneath the middle finger, a lock plate may be mounted onto the exposed upper surface of the middle finger. Upper and lower extensions of the lock plate will then engage the belt portions overlying the upper and lower fingers. The lock plate may be mounted onto a threaded stud that extends upward from the middle finger and held in place by the child-proof knob discussed above which will cause a clamping action between the upper extension of the lock plate and the upper finger as well as between the lower extension of the lock plate and the lower finger.

Accordingly, a variety of clamps have been provided to prevent relative movement of the overlying shoulder portions and lap portions of the seat belt so that a child safety seat will be safely held in place during hard braking, collisions and normal driving maneuvers. All embodiments illustrated above and below are easy to use so parents can easily use the devices in the correct manner. Further, all of the devices includes child-proof features which will preclude tampering with the devices by the child even though they are used adjacent to the child safety seat.

It is therefore an object of the present invention to provide an approved apparatus for clamping the shoulder and lap portions of a seat belt together to preclude movement of a child safety seat during hard braking, collisions and normal driving maneuvers.

It is therefore an object of the present invention to provide a child-proof locking mechanism for seat belt clamps for use with child safety seats.

Other features and advantages of the present invention will appear from the following description in which three embodiments have been set forth in detail in conjunction with the accompanying drawings.

BRIEF DESCRIPTION OF THE DRAWINGS

This invention is illustrated more or less diagrammatically in the accompanying drawings, wherein:

FIG. 6 is a side plan view of the seat belt gripping device shown in FIG. 4 in a gripping or locked position;

FIG. 7 is a front end view of the child safety clamp as shown in FIG. 6;

FIG. 8 is a top plan view of the child safety clamp shown in FIG. 6;

FIG. 9 is a bottom plan view of the child-proof knob of the present invention;

FIG. 10 is a side sectional view of the child-proof knob assembly shown in an inoperable position;

FIG. 11 is a side sectional view of the child-proof knob assembly of the present invention shown in an operable position;

FIG. 12 is a top plan view of a second seat belt gripping device made in accordance with the present invention, as shown in an unlocked position;

FIG. 13 is a top plan view of the seat belt gripping device shown in FIG. 12 in a locked position;

FIG. 14 is a perspective view of the locking brace shown in FIG. 12;

FIG. 15 is a top plan view of a third embodiment of a seat belt gripping device made in accordance with the present invention;

FIG. 16 is a perspective view of the seat belt gripping device shown in FIG. 15; and FIG. 17 is an end view of the seat belt gripping device shown in FIG. 16.

Figure 1:
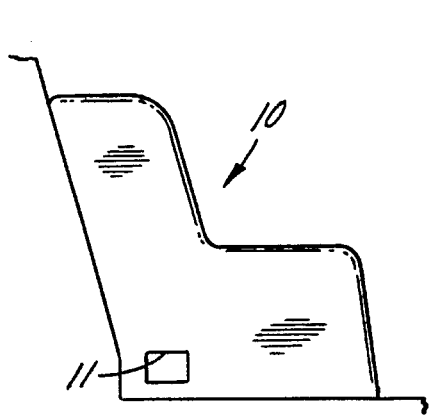
FIG. 1 is a side view of a child safety seat.

It should be understood that the drawings are not necessarily to scale and that the embodiments are sometimes illustrated by graphic symbols and diagrammatic representations. In certain instances, details which are necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS

Like reference numerals will be used to refer to like or similar parts from figure to figure in the following description of the drawings.

Figure 2:
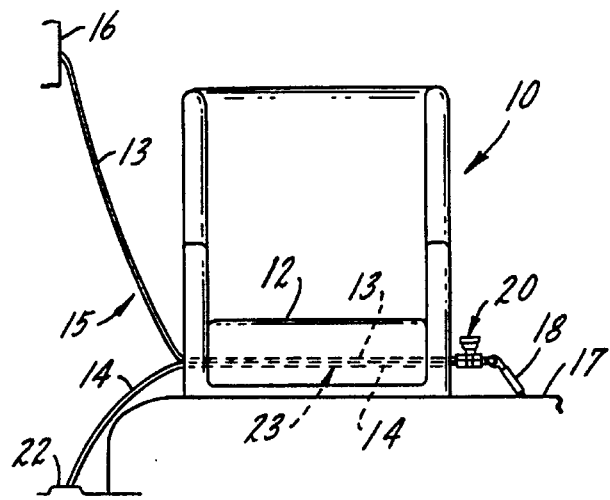
FIG. 2 is a front elevational view of a child safety seat as installed on a car seat and held in place by a conventional safety belt mechanism and a seat belt gripping device made in accordance with the present invention.

The child safety seat 10 is illustrated in FIGS. 1 and 2. The safety seat 10 includes an aperture 11 disposed underneath the seat portion 12 (see FIG. 2) which accommodates two overlying shoulder and lap portions 13, 14 of the seat belt 15 as shown in FIG. 2. It will be noted that a standard seat belt apparatus 15 is illustrated in FIG. 2. A shoulder portion 13 is attached to an inertia locking wind-up reel shown generally at 16; the lap portion 14 is connected directly to the floor at the anchor 22. The inertia locking wind-up reel 16 allows additional shoulder belt material 13 to be unwound from the reel as needed when the shoulder belt portion 13 is pulled gradually outward or forward. When the car stops or brakes suddenly, the inertia locking wind-up reel 16 will release a short amount of belt material 13 (perhaps 6"–8") before the wheel 16 locks and prevents any additional shoulder belt material 13 from being withdrawn which acts to restrain the passenger in the seat 17.

While the shoulder belt portion 13 with locking wind-up reel 16 is effective for restraining an adult passenger in the seat 17, the apparatus 15 as shown in FIG. 2 is not effective for restraining children in a car seat 10 for the following reasons. First, it will be noted that the seat belt buckle 18 allows free transfer of belt material between the shoulder portion 13 and the lap portion 14. Thus, when the wind-up reel 16 releases a limited amount of belt material during a sudden stop, some slack will be provided in the shoulder belt portion 13. The slack will then be freely transferred through the buckle 18 to the lap portion 14 thereby allowing the child seat 10 to thrust forward. The forward motion, albeit limited due to the delayed action of the inertia locking wind-up reel 16, is enough to cause serious injury to the shoulders and neck of a small child. In fact, it has been found that the child seat 10 will move forward in a pivoting motion about an axis disposed adjacent to the buckle 18 which results in a forward twisting motion of the seat 10. The forward twisting motion will result in neck and shoulder injuries unless the seat belt system 15 is modified. The above description assumes that the safety device 20 provided by the present invention is not installed.

Figure 3:
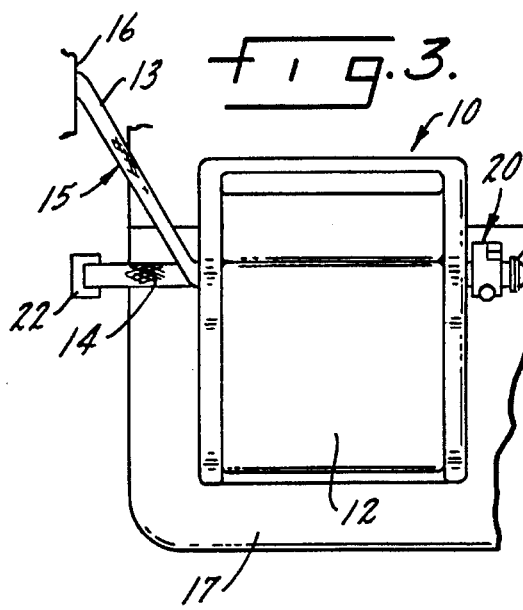
FIG. 3 is a top plan view of the child safety seat, seat belt mechanism and seat belt gripping device shown in FIG. 2.

However, the problem addressed above is alleviated when a safety device 20 is installed as shown in FIG. 2. All that a parent needs to do is grasp the lap belt 14 at or around the place where the device 20 is clamped in FIG. 2 and pull any slack in the lap portion 14 through the buckle 18. This action will tighten the lap belt 14 within the aperture 11 underneath the seat 12. Then the parent clamps the device 20 on the two belts 13, 14 as shown in FIGS. 2 and 3 and described below. By clamping or gripping the now-taut lap belt 14 to the shoulder belt 13 on opposing sides of the buckle 18, the shoulder belt 13 and inertia-locking wind-up reel 16 has been essentially isolated. The seat 10 is effectively held in place by the lap belt 14 which is anchored to the car floor at 22 and at the buckle 18 (which is also anchored to the car floor underneath the seat 12). Any slack appearing in the lap portion 14 between the device 20 and the fixed anchor 22 will be irrelevant. Without the safety device 20, the parent will have to pull with great strength upward on the shoulder portion 13 so that any slack in the lap portion 14 is pulled through the aperture 11 underneath the seat 12 and then through the buckle 18 before being pulled again through the aperture 11 underneath the seat 12 and then upward along the shoulder portion 13 before being wound up in the wind-up reel 16. In practice, this effort at slack removal has proven nearly impossible and is also ineffective because the wind-up reel 16 will release some slack anyway in the event of a sudden stop.

Figure 4:
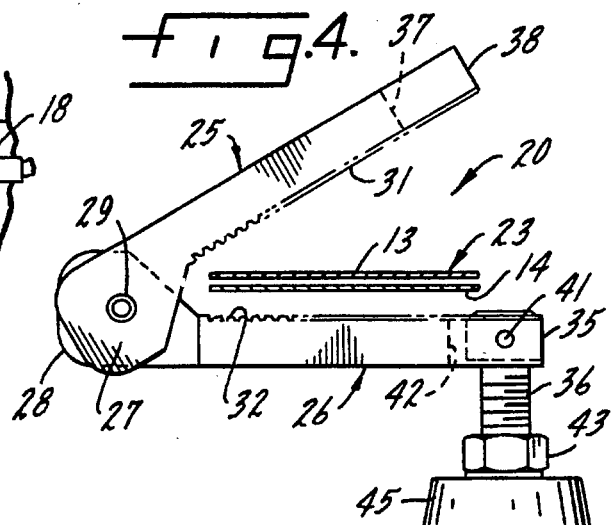
FIG. 4 is a side plan view of the seat belt gripping device shown in FIG. 1.

Turning now to FIG. 4, one embodiment of the safety device 20 of the present invention is illustrated. The device 20 includes a first or upper clamp half 25 which is pivotally attached to the second or lower clamp half 26 at their respective knuckles 27, 28. A pin 29 provides the pivotal connection between the clamp half 25 and clamp half 26. Each clamp half 25, 26 includes inside gripping surfaces 31, 32 for engaging the overlying belt portions 23 which, of course, include the shoulder belt portion 13 and lap belt portion 14.

Figure 5:
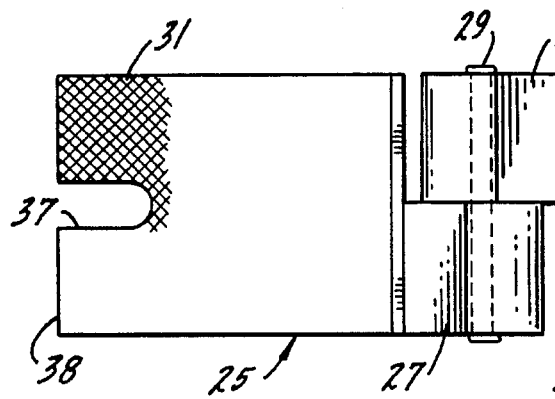
FIG. 5 is a top plan view of the seat belt gripping device shown in FIG. 4 in an open position.
Figure 5:
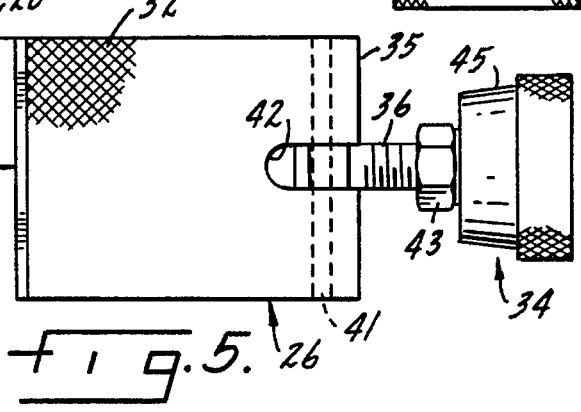

A significant improvement contributed by the device 20 is the child-proof locking assembly 34 which provides a means for tightening and locking the two clamp halves 25, 26 together. The child-proof locking assembly 34 is pivotally attached to the locking end 35 of the clamp half 26 by the threaded closure pin 36. A slot or opening 37 is provided in the locking end 38 of the clamp half 25 for receiving the closure pin 36 as illustrated in FIGS. 5 and 6. A pin 41 provides the pivotal attachment between the threaded closure pin 36 and the locking end 35 of the clamp half 26. As best seen in FIG. 5, the threaded closure pin 36 is accommodated in a slot 42 through which the pin 41 passes. Turning the FIG. 6, to means for tightening and locking the two clamp halves 25, 26 together includes the cooperation of the child-proof knob 45 and the lower nut portion 43. As shown in FIG. 6, when the two clamp halves 25, 26 are folded together into a clamping position, the knob 45 and closure pin 36 are pivoted upward as shown in FIG. 6. The clamp halves 25, 26 are then forced together by the engagement between the lower nut portion 43 and the upper surface 44 of the clamp half 25. The operation of the child-proof locking assembly 34 is further illustrated with respect to FIGS. 9, 10 and 11.

Specifically, referring to FIG. 9, a bottom view of the knob body 45 is provided. The lower surface 46 includes a bottom opening 47 which is of a configuration that will cooperate with the shape of the nut 43 to provide mateable engagement between the bottom opening 47 and the nut 43. As seen in FIG. 11, when the knob body 45 is pushed downward, the bottom opening 47 mateably engages the nut 36 so that the nut 36 will rotate in either direction when the knob 45 is rotated.

Turning to FIG. 10, the knob body 45 includes a closed top 48 and interior wall 49. The hollow interior defined by the wall 49 is wider than the bottom opening 47, thereby providing a ledge 51 disposed between the interior wall 49 and the bottom opening 47.

Still referring to FIG. 10, the lower nut 43 is attached to a tubular body 53 and a flange 54. The nut 43, body 53 and flange 54 may be fabricated from a single piece of material and may also be further characterized as a threaded nut assembly. Or, the three parts 43, 53, 54 may be manufactured separate components and thereafter attached to one another. The nut portion 43 threadably engages the closure pin 36.

Comparing the assembly 34 as shown in FIG. 10 with that as shown in FIG. 11, it is evident that the assembly 34 shown in FIG. 10 is in an inoperable position. That is, the spring 55 disposed between the top 48 and the ledge 51 within the knob body 45 has biased the knob body 45 upward so that the flange 54 is in contact with the ledge 51. In the position shown in FIG. 10, the bottom opening 47 is disposed above the nut 43. Any rotation of the knob body 45 will cause the smooth ledge 51 to rotate against the smooth flange 54 which will result in rotation of the nut 43 only until the nut 43 engages resistance imposed by the upper surface 44 of the clamp half 25. As shown in FIG. 11, when the knob body 45 is depressed downward and the spring 55 is compressed, the bottom opening 47 is pushed downward over the nut 43. In the position shown in FIG. 11, rotation of the knob body 45 will result in rotation of the nut 43 on the threaded closure pin 36 to exert a clamping force on the upper surface 44 of the clamp half 25 as shown in FIG. 6. Raising of the assembly 34 will result in a release of clamping force imposed by the nut 43 against the surface 44. The hole 57 disposed in the lower end of the closure pin 36 accommodates the pin 41 as shown in FIG. 5.

Related alternative embodiments of the present invention are illustrated FIGS. 12 through 17.

Specifically, referring to FIGS. 12–14, the device 70 includes an E-shaped plate member 71 having an upper finger 72, a middle finger 73 and a lower finger 74. Each of the fingers 72, 73, 74 include distal ends 75, 76, 77, respectively. The overlying belt portions shown at 78 are inserted through the upper and lower slots 81, 82 so that the belt portions 78 are disposed behind the middle finger 73. To preclude the belt portions 78 from migrating laterally outward toward the distal ends 75, 76, 77 of the fingers 72, 73, 74, a locking brace 83 is provided. The locking brace 83 is pivotally connected to the distal end 77 of the finger 74 with a pin 84, so that the brace 83 may pivot upward toward the distal end 75 of the finger 72 as shown in FIG. 13. A bead 85 may be provided on the distal end 75 of the finger 72 which is received in the detent or hole shown at 86 in the brace 83. A safety lock is illustrated at 87 which is essentially a U-shaped member pivotally attached to the finger 72 with a pin 88. The U-shaped safety lock 87 pivots downward over the distal end 89 of the brace 83 once the bead 85 of the finger 72 is received within the hole or detent 86 of the brace 83. The engagement between the lock 87 and the distal end 89 of the brace 83 is frictional in nature which will preclude a child from removing the lock 87 once it is secured. As shown in FIG. 14, the brace 83 is preferably U-shaped in configuration so that the distal ends 75, 76, 77 of the fingers 72, 73, 74 are received within the U-shaped cross section of the brace 83.

A variation of the device 70 as shown in FIG. 12 is illustrated in FIGS. 15 through 17. Specifically, the device 100 features an E-shaped plate 101 with fingers 102, 103, 104 similar to that shown with respect to the device 70 of FIG. 12. Again, the overlying belt portions shown at 105 are inserted through the slots 105, 106 so that the overlying belt portions 105 are disposed behind the middle finger 103. To preclude the overlying belt portions 105 from migrating past the distal ends 107, 108, 109 of the fingers 102, 103, 104, the I-shaped brace 111 is provided as shown in FIG. 15. Further, an upwardly protruding threaded stud 112 is provided in the upper surface 113 of the finger 103. The stud 112 is accommodated in the hole 114 of the brace 111 (see FIG. 17). When the brace is installed as shown in FIGS. 16 and 17, the upper portion 116 of the brace 111 clamps the overlying belts 105 against the upper surface 117 of the finger 102. Further, the lower portion 118 of the brace 111 clamps the belts 105 against the upper surface 119 of the finger 104. To provide a clamping engagement between the upper and lower portions 116, 118 of the brace 111 and the fingers 102, 104, the child-proof locking assembly 34 may be provided (see FIG. 9–11).

Thus, easy-to-use, child-proof devices have been provided to hold overlying shoulder and lap portions of the seat belt together in order to properly secure a child safety seat in place on a car seat. While only three embodiments of the present invention have been illustrated and described, it will at once be apparent to those skilled in the art that variations may be made within the spirit and scope of the present invention. Accordingly, it is intended that the scope of the invention be limited solely by the scope of the hereafter appended claims and not by any specific wording in the foregoing description.

We claim:

1. A device for holding a child car seat in position by preventing relative movement of overlying shoulder and lap seat belt portions with respect to each other, the device comprising:

a first clamp half pivotally connected to a second clamp half, each of said clamp halves including a locking end for accommodating a child-proof means for tightening and locking the first and second clamp halves together in a clamping position, said means for tightening and locking being further characterized as including a threaded closure pin being pivotally connected to the locking end of the second clamp half, the threaded closure pin extending above an upper surface of the first clamp half when the child-proof means for tightening and locking is in the clamping position, a child-proof knob threadably connected to the threaded closure pin, the child-proof knob being spring biased into an inoperable position, the child-proof knob assuming an operable position when said child-proof knob is pressed in a downward direction toward the upper surface of the first clamp half so that rotation of the child-proof knob results in axial movement of the knob along the threaded closure pin to either tighten or loosen the engagement between the child-proof knob and the upper surface of first clamp half.

2. A device for holding a child car seat in position by preventing relative movement of overlying shoulder and lap seat belt portions with respect to each other, the device comprising:

a first clamp half pivotally connected to a second clamp half, each of said clamp halves including a locking end for accommodating a child-proof means for tightening and locking the first and second clamp halves together in a clamping position, each of said clamp halves including an inside gripping surface for frictionally engaging one said seat belt portions, said child-proof means for tightening and locking being further characterized as including a threaded closure pin being pivotally connected to the locking end of the second clamp hall the threaded closure pin extending above an upper surface of the first clamp half when the child-proof means for tightening and locking is in the clamping position, a child-proof knob threadably connected to the threaded closure pin, the child-proof knob being biased into an inoperable position, the child-proof knob assuming an operable position when said child-proof knob is pressed in a downward direction toward the upper surface of the first clamp half when the first and second clamp halves and the threaded closure pin are in the clamping position, rotation of the child-proof knob when said knob is pressed downward into the operable position results in axial movement of the knob along the threaded closure pin to either tighten or loosen the engagement between the child-proof knob and the upper surface of first clamp half when the clamp is in the clamping position.

3. The device of claim 2, wherein the child-proof knob is further characterized as including a threaded nut assembly, a knob and a spring, the closure pin also extending into and being threadably connected to the threaded nut assembly, the threaded nut assembly including a lower nut portion for engaging the outer surface of the first clamp half to clamp the seat belt portions together between the gripping surfaces of the first and second clamp halves, the threaded nut assembly also including a narrow tubular body for extending upward into the knob, and the threaded nut assembly also including a wider upper flange that is accommodated within the knob, the knob including a bottom opening through which the narrow tubular body of the threaded nut assembly passes, the bottom opening mateably engaging the lower nut portion of the threaded nut assembly when the knob is pressed downward into the operable position, the knob also including a hollow interior into which the narrow tubular body extends and in which the wider upper flange and the spring are accommodated, the hollow interior being wider than the bottom opening, the hollow interior including a lower ledge where the hollow interior meets the bottom opening, the knob also including a closed top, the spring extending between the wider upper flange and the top and biasing the upper flange against the lower ledge, the knob assuming the operable position when the knob is pushed downward to collapse the spring and to push the bottom opening into mateably engagement with the lower nut portion so that rotation of the knob results in rotation of the lower nut portion to either tighten or loosen the engagement between the lower nut portion and the upper surface of first clamp half.

4. A device for holding a child car seat in position by preventing relative movement of overlying shoulder and lap seat belt portions with respect to each other, the device comprising:

a first clamp half pivotally connected to a second clamp half, each of said clamp halves including a locking end for accommodating a child-proof locking assembly, each of said clamp halves including an inside gripping surface for frictionally engaging one said seat belt portions, the first clamp half including an outer surface for engaging the locking assembly, the locking assembly including threaded closure pin, a threaded nut assembly, a knob and a spring, the threaded closure pin being pivotally connected to the locking end of the second clamp half, the closure pin also extending into and being threadably connected to the threaded nut assembly, the threaded nut assembly including a lower nut portion for engaging the outer surface of the first clamp half to clamp the seat belt portions together between the gripping surfaces of the first and second clamp halves, the threaded nut assembly also including a narrow tubular body for extending upward into the knob, and the threaded nut assembly also including a wider upper flange that is accommodated within the knob, the knob including a bottom opening through which the narrow tubular body of the threaded nut assembly passes, the bottom opening mateably engaging the lower nut portion of the threaded nut assembly when the knob is pressed downward into an operable position, the knob also including a hollow interior into which the narrow tubular body extends and in which the wider upper flange and the spring are accommodated, the hollow interior being wider than the bottom opening, the hollow interior including a lower ledge where the hollow interior meets the bottom opening, the knob also including a closed top, the spring extending between the wider upper flange and the top and biasing the upper flange against the lower ledge, the knob assuming the operable position when the knob is pushed downward to collapse the spring and to push the bottom opening into mateably engagement with the lower nut portion so that rotation of the knob results in rotation of the lower nut portion to either tighten or loosen the engagement between the lower nut portion and the upper surface of first clamp half.

5. The device of claim 4, wherein the locking end of the first clamp half includes an opening through which the closure pin extends.

* * * * *